US012779695B2

(12) United States Patent
Chevron et al.

(10) Patent No.: US 12,779,695 B2
(45) Date of Patent: Nov. 3, 2026

(54) METHOD FOR CALIBRATING A MULTI-AXIS ROBOT EQUIPPED WITH A CAMERA AND A PRINTING HEAD AND ROBOT CONFIGURED TO IMPLEMENT SUCH A METHOD

(71) Applicant: EXEL INDUSTRIES, Epernay (FR)

(72) Inventors: Didier Chevron, Moirans (FR); Juan Palacio, Grenoble (FR); Nicolas Chouan, Allevard-les-bains (FR)

(73) Assignee: EXEL INDUSTRIES, Epernay (FR)

(*) Notice: Subject to any disclaimer, the term of this patent is extended or adjusted under 35 U.S.C. 154(b) by 61 days.

(21) Appl. No.: 18/968,860

(22) Filed: Dec. 4, 2024

(65) Prior Publication Data

US 2025/0178203 A1 Jun. 5, 2025

(30) Foreign Application Priority Data

Dec. 5, 2023 (FR) ...................................... 2313581

(51) Int. Cl.
*B25J 9/16* (2006.01)
*B25J 11/00* (2006.01)
*G06T 7/73* (2017.01)

(52) U.S. Cl.
CPC ........... *B25J 9/1692* (2013.01); *B25J 9/1697* (2013.01); *B25J 11/0075* (2013.01); *G06T 7/73* (2017.01)

(58) Field of Classification Search
CPC .... B25J 9/1692; B25J 9/1697; B25J 11/0075; G06T 7/70–75; G05B 2219/39024
See application file for complete search history.

(56) References Cited

U.S. PATENT DOCUMENTS

| | | | |
|---|---|---|---|
| 2019/0015991 A1 | 1/2019 | Liu et al. | |
| 2022/0258352 A1 | 8/2022 | He et al. | |
| 2025/0150546 A1* | 5/2025 | Moribe | H04N 1/03 |

FOREIGN PATENT DOCUMENTS

| | | |
|---|---|---|
| CN | 109483516 B | 6/2020 |
| CN | 115431278 A | 12/2022 |

(Continued)

OTHER PUBLICATIONS

Mooring et al., "Fundamentals of manipulator calibration", Dec. 1991, 342 pages.

(Continued)

*Primary Examiner* — Spencer D Patton
(74) *Attorney, Agent, or Firm* — Thompson Coburn LLP; Steven M. Ritchey

(57) ABSTRACT

According to this method, a mathematical surface $$(P^{BF}_{ref})$$

is determined (104), a printing head is brought into a first position and then into a second position, where a first impact and a second impact are printed (106, 110), then the coordinates of a characteristic point $$(P^{BF}_{1,4}, P^{BF}_{2,4})$$

of the first or second impact (108, 112) are measured. We express (114) the coordinates of a first intersection point (Continued)

$(I_{1,4}^{BF})$ and those of a second intersection point $(I_{2,4}^{BF})$.

We express (120) a deviation ($\vec{\varepsilon}_k$) based on the coordinates of the characteristic points $(P_{k,j}^{BF})$ and intersection point $(I_{k,j}^{BF})$.

We construct (122) an objective function (F) whose variables are the deviations ($\vec{\varepsilon}_k$). We determine (124) values for six parameters ($X_1$-$X_6$) of a passage matrix ($T^{TCP \rightarrow PG}$) which minimise the objective function (F). These six parameters ($X_1$-$X_6$) are used (128) to define an oriented position of the frame (TCP) linked to the printing head in the frame linked to the wrist.

14 Claims, 5 Drawing Sheets

(56) References Cited

FOREIGN PATENT DOCUMENTS

| | | | | | |
|---|---|---|---|---|---|
| CN | 115533893 | A | | 12/2022 | |
| CN | 115741720 | A | | 3/2023 | |
| DE | 102016204123 | A1 | * | 10/2016 | B41J 3/4073 |
| EP | 4159386 | A1 | | 4/2023 | |
| FR | 3061076 | A1 | * | 6/2018 | B32B 3/12 |

OTHER PUBLICATIONS

Park, "Machine-vision assisted 3D printing", Sep. 2016, 72 pages, URL:https://dspace.mit.edu/handle/1721.1/113162.

Puskorius et al., "Global Calibration of a Robot/Vision System", Proceedings 1987 IEEE International Conference on Robotics adn Automation, 1987, pp. 190-195, vol. 1.

Waldron et al., "Kinematics", Springer Handbook of Robotics, Dec. 2016, pp. 11-35.

Zhang et al., "An accurate hand-eye calibration algorithm with global optimization", Proceedings of SPIE, Jul. 2018, 6 pages, vol. 10827.

* cited by examiner

METHOD FOR CALIBRATING A MULTI-AXIS ROBOT EQUIPPED WITH A CAMERA AND A PRINTING HEAD AND ROBOT CONFIGURED TO IMPLEMENT SUCH A METHOD

CROSS-REFERENCE TO RELATED APPLICATIONS

This application claims the benefit of FR 2313581, filed on Dec. 5, 2023, which is incorporated herein by reference in its entirety.

FIELD OF INVENTION

This invention relates to a method of calibrating a multi-axis robot associated with a base frame and equipped with a camera and a printing head.

BACKGROUND

In the field of coating product application using a multi-axis robot equipped with a printing head, it is important to be able to control the operation of this printing head precisely, in particular by taking into account the positioning of this printing head in relation to a surface to be coated. To do this, a multi-axis robot is fitted with a camera that can identify the robot's environment, in particular a surface to be coated, against which the printing head is to be positioned.

To date, the operation of a multi-axis robot equipped with a printing head is based on the assumption that the position and orientation of an orthogonal frame linked to the printing head is known in relation to a frame linked to the robot's wrist and to a fixed base frame linked to a place in which the multi-axis robot is positioned. The exact position of this frame linked to the printing head depends in particular on the way and the precision with which the printing head is mounted on the robot's wrist.

It is known from FR3061076A1 to calibrate the position of a printing head mounted on a robot, before each cycle of operation of this printing head, by carrying out an automatic verification of an actual position of a print point with respect to a reference point of the printing head and then, if necessary, a correction of a deviation between a print point and a reference point of the printing head. This method is relatively complex to implement and the teaching in this document does not optimise calibration.

On the other hand, DE102016204123A1 discloses a marking method using labels in which fine positioning of a printing head is used, without explaining how such fine positioning can be achieved.

There is therefore a need for an effective calibration method for a multi-axis robot equipped with a camera and a printing head. such a method should enable the printing head to be set up easily and accurately, without being too complex or requiring the use of labels.

SUMMARY OF THE INVENTION

To this end, the invention relates to a method of calibrating a multi-axis robot associated with a base frame and equipped with a camera and a printing head comprising at least a first nozzle, the camera and the printing head being mounted on a wrist of the multi-axis robot. In accordance with the invention, this method consists of determining an oriented position of a frame linked to the printing head in a frame linked to the wrist, the oriented position of the frame linked to the printing head being defined by six parameters of a matrix passing between the frame linked to the printing head and the frame linked to the wrist. The method comprises at least the following steps consisting in:

a) aiming the camera at least one point on a fixed surface in the fixed frame;
b) determining, from the result of step a), a mathematical surface representative of the fixed surface;
c) bringing the printing head into a first position relative to the fixed surface, in which the printing head is oriented towards the fixed surface;
d) when the printing head is in the first position, printing at least a first impact on the fixed surface by means of the first nozzle;
e) measuring, with the camera, the coordinates, in the base frame, of a first characteristic point of the first impact;
f) bringing the printing head into at least one second position relative to the fixed surface, different from the first position and in which the printing head is oriented towards the fixed surface;
g) when the printing head is in the second position, printing at least one second impact on the fixed surface by means of the first nozzle;
h) measuring, with the camera, the coordinates, in the base frame, of a second point characteristic of the second impact;
i) expressing, in the BF base frame and with the passage matrix, the coordinates of a first point of intersection between the mathematical surface representative of the fixed surface and a line passing through the first nozzle in the first position;
j) expressing, in the BF base frame and using the passage matrix, the coordinates of a second point of intersection between the mathematical surface representing the fixed surface and the line passing through the first nozzle in the second position;
k) expressing, for each printing head position and each impact, a deviation based on the coordinates of its characteristic point and the coordinates of its intersection point;
l) constructing an objective function whose variables are the deviations expressed in step k);
m) determining the values of the six parameters of the passage matrix that minimise the objective function;
n) using the six parameters determined in step m) to define the oriented position of the frame linked to the printing head in the frame linked to the wrist.

The steps in the method of the invention make it possible to define the oriented position of a frame linked to the printing head in the frame linked to the wrist, which makes it possible to position the printing head correctly in space. In other words, the invention makes it possible to know the position and orientation of the printing head in a frame of reference linked to the robot's wrist, whereas the robot model makes it possible to know the position of the wrist in a base frame of reference, linked to the room in which the robot is installed. The invention's method therefore enables precise relative positioning between the printing head and a fixed surface to be coated by this printing head.

According to advantageous but not mandatory aspects of the invention, such a method may incorporate one or more of the following features, taken in any combination that is technically feasible:

in step d) a third impact is printed on the fixed surface by means of the second nozzle;

in step e), one measures, with the camera, the coordinates, in the base frame, of a third point characteristic of the third impact;

in step g), a fourth impact is printed on the fixed surface by means of the second nozzle;

in step h), one measures, with the camera, the coordinates, in the base frame, of a fourth point characteristic of the fourth impact;

in step i), the coordinates of a third point of intersection between the mathematical surface representative of the fixed surface and a line passing through the second nozzle in the first position are expressed, in the base frame and with the passage matrix;

in step j), the coordinates of a fourth point of intersection between the mathematical surface representative of the fixed surface and the line passing through the second nozzle in the second position are expressed, in the base frame and with the passage matrix.

An axis of the frame linked to the printing head is parallel to the directions of ejection of the two nozzles of the printing head, while the two nozzles are disposed on either side of and at equal distance from a reference nozzle of the printing head through which the axis of the frame linked to the printing head passes.

The six parameters of the passage matrix can be broken down into three translation parameters and three rotation parameters, and step m) comprises sub-steps consisting in:

m1) determining the three rotation parameters by minimising the objective function constructed in step l)

m2) expressing, for each printing head position and nozzle, a further deviation based on the coordinates of its characteristic point and the coordinates of its intersection point, the further deviation being different from that expressed in step k);

m3) constructing another objective function, whose variables are the deviations expressed in sub-step m2);

m4) determining the three translation parameters, minimising the objective function constructed in step m3)

The other difference is expressed in the form $$\vec{\alpha_k} = T^{TCP\rightarrow PG} \times \begin{bmatrix} 0 \\ 0 \\ 0 \\ 1 \end{bmatrix} - \frac{1}{2} \times \left(P_{k,j}^{BF} + P_{k,j'}^{BF}\right)$$

or in the form $$\vec{\alpha_k} = \frac{1}{2} \times \left(I_{k,j}^{BF} + I_{k,j'}^{BF}\right) - \frac{1}{2} \times \left(P_{k,j}^{BF} + P_{k,j'}^{BF}\right)$$

where $\vec{\alpha}_k$ is the other deviation expressed in sub-step m2) for position k $$I_{k,j}^{BF}$$

are the coordinates, in the base frame, of the intersection point of the nozzle of rank j for position k $$P_{k,j}^{BF}$$

are the coordinates, in the base frame, of the characteristic point of the impact printed with the nozzle of rank j for position k $T^{TCP\rightarrow PG}$ is the passage matrix from the frame linked to the printing head to the frame linked to the wrist;

$$\begin{bmatrix} 0 \\ 0 \\ 0 \\ 1 \end{bmatrix}$$

is the expression of the point of origin of the printing head-related frame in the printing head-related frame.

The method comprises a step of correcting the point of origin of the frame linked to the printing head, implemented between steps m) and n) and consisting in:

p1) placing the printing head opposite the fixed surface and perpendicular to the fixed surface, in a position where the point of origin of the frame linked to the printing head is in the mathematical surface representative of the fixed surface (S);

p2) measuring the distance between the printing head and the fixed surface;

p3) correcting the translation parameters by applying a translation along the height axis of the frame linked to the printing head, so that the distance measured in step p2) is equal to a predetermined distance Steps c) and d) are carried out before step e) and steps f) and g) are carried out before step h).

The first and second positions are selected arbitrarily.

The or each objective function is the sum of the squares of the deviations expressed in step k) and, optionally, step m2).

The values of the six parameters in step m) are determined by solving a system of non-linear equations by means of partial derivatives, starting from a nearby position, according to the method of least squares, Newton's method, the gradient method, the Levenberg-Marquardt method, the Newton-Raphson method, the secant method, a dichotomy method, an iterative method or by discretising the domain of the six parameters around the near position and evaluating the objective function.

During step i) and/or j), the expression of the coordinates of the intersection points is obtained by expressing the intersection between the mathematical surface representing the fixed surface and a ballistic line coming from the corresponding nozzle.

According to another aspect, the invention relates to a multi-axis robot associated with a base frame and equipped with a camera and a printing head, the printing head comprising at least a first nozzle, the camera and the printing head being mounted on a wrist of the multi-axis robot. In accordance with the invention, this robot comprises an electronic control unit configured to implement a calibration method as described above.

This robot offers the same advantages as the method described in the invention.

BRIEF DESCRIPTION OF THE DRAWINGS

The invention will be better understood and other advantages thereof will become clearer in the light of the following description of an embodiment of a calibration method and a multi-axis robot in accordance with its principle, given by way of example only and made with reference to the appended drawings.

DETAILED DESCRIPTION

Figure 1:
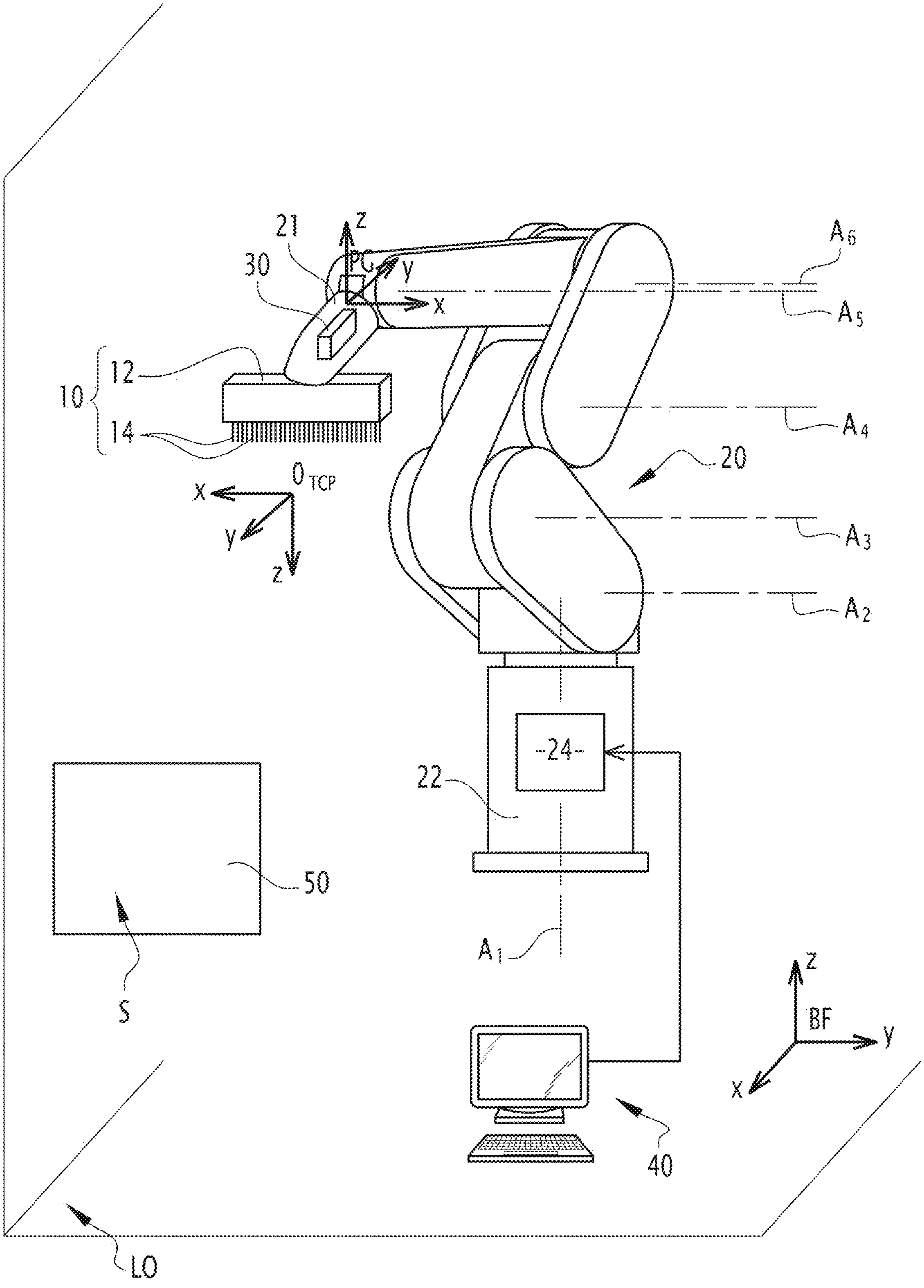
FIG. 1 is a schematic representation of the principle of a multi-axis robot conforming to the invention in use with the method of the invention.
Figure 2:
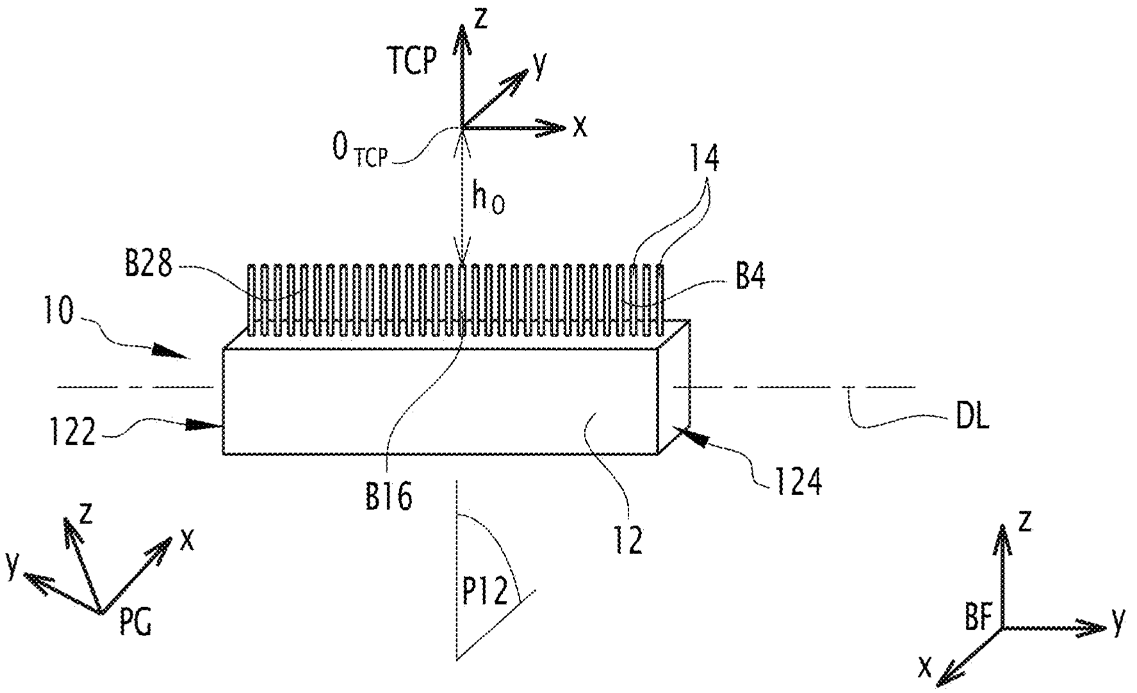
FIG. 2 is a schematic representation of a printing head of the robot shown in FIG. 1 and geometric reference points associated with the operation of this robot.

The multi-axis robot 20 shown in FIG. 1 comprises an arm formed by sections articulated together about six axes $A_1$ to $A_6$, and a wrist 21 which forms the distal end of this arm. According to a non-represented variant of the invention, the wrist can be articulated relative to the end of the arm of the multi-axis robot 20, about a seventh axis.

A printing head 10 comprises a rigid body 12 fitted with a nozzle 14. This printing head 10 is mounted on the wrist 21. It is designed to apply a coating product, such as paint or varnish, to objects not shown, such as motor vehicle bodies.

A camera 30 is mounted on the wrist 21 and fixed to it by appropriate mechanical means, such as screws or clips. The camera 30 is attached to the wrist 21 in a way that is strong enough to withstand the accelerations to which the camera is subjected as the robot moves.

Advantageously, the camera is a CCD or laser camera with one or two cameras (binocular and/or profilometer).

Consider a fixed BF base frame, which is linked to a room LO in which the multi-axis robot 20 is located.

Consider a PG frame linked to wrist 21. A model of the robot can be used to switch from the PG frame to the BF frame, and vice versa. This model is well known. By way of a non-limitative example, this may be the "Denavit-Hartenberg" model, or the "Modified Denavit-Hartenberg" model, also known as the "Khalil Kleinfinger" model, or the PoE (Product of Exponential) model.

We consider a TCP frame linked to the printing head 10 and which is arranged, in a longitudinal direction LD of the body 12, opposite a reference nozzle. This orientated frame is sometimes referred to as the "Tool Centre Point". The x-axis of the TCP frame is parallel to the longitudinal direction LD and its point of origin $O_{TCP}$, which is the centre of the TCP frame, is noted.

In the example, the printing head 10 has thirty-two nozzles distributed on either side of a median plane P12 of the body 12 which contains the y and z axes of the TCP frame and to which the x axis of this frame is perpendicular. The median plane P12 is located halfway along the abscissa axis and the longitudinal direction LD, between longitudinal ends 122 and 124 of the body 12.

j is the rank of a nozzle 14 in the row of nozzles 14, where j is a natural number between 1 and 32. Bj is a nozzle of rank j.

The x-axis of the TCP frame is oriented from nozzle B32 to nozzle B1.

In the example shown, the reference nozzle is B16. The point of origin $O_{TCP}$ is therefore located opposite nozzle B16.

The height axis z of TCP passes through the reference nozzle B16 and is oriented away from the body 12.

Alternatively, the reference nozzle is another nozzle in the row of nozzles 14, the point of origin $O_{TCP}$ then being located opposite this other nozzle and the height axis z then passing through this other nozzle, being oriented away from this other nozzle.

The point of origin $O_{TCP}$ is located at a height $h_O$, measured parallel to the z axis, from the outlet of the nearest nozzle 14. The height $h_O$ is set at a value between 2 and 30 mm, preferably 10 mm.

By convention, the z-height axis of the TCP frame is parallel to the direction of ejection of the nozzles 14 and oriented in the direction of ejection. The z-height axis is aligned with the ejection direction of the reference nozzle, in this case nozzle B16.

The y axis of the TCP frame is perpendicular to the x and z axes.

The invention's calibration method consists of determining an oriented position of the TCP reference linked to the printing head in the PG reference linked to the wrist 21.

This method is implemented in a computer 40 which is shown in FIG. 1 in the form of a computer and which communicates with a controller 24 arranged in a base 22 of the robot 20. The computer 40 is programmed to implement the method of the invention automatically. The controller 24 and the computer 40 together form an electronic control unit for the multi-axis robot 20.

Alternatively, the parts 24 and 40 of this control unit are formed by a single physical entity, which can be integrated into the base 22.

Consider a physical surface S supported by a plate 50, fixedly positioned near the robot 20, in the room LO, in an area accessible to the printing head 10. Robot 20 is capable of projecting paint droplets onto surface S. The fixed surface S is the surface of a plate 50 which acts as a support for the droplets of printed coating products.

The method of the invention begins with a start-up step 100 during which the controller 24 and the computer 40 are initialised.

In a second step 102 of the invention, the robot 20 uses its camera 30 to scan the surface S which is fixed in the base frame BF. This operation of locating the surface S takes place by means of several readings represented in FIG. 3 by aiming points $PV_1$, $PV_2$, . . . . $PV_N$ adopted successively by the printing head 10 carried by the robot arm 20.

At least one aiming point is used, enabling at least one cloud of several points on the fixed surface S to be aimed at. In practice, several aiming points are used, particularly if the fixed surface S is left-handed.

Figure 3:
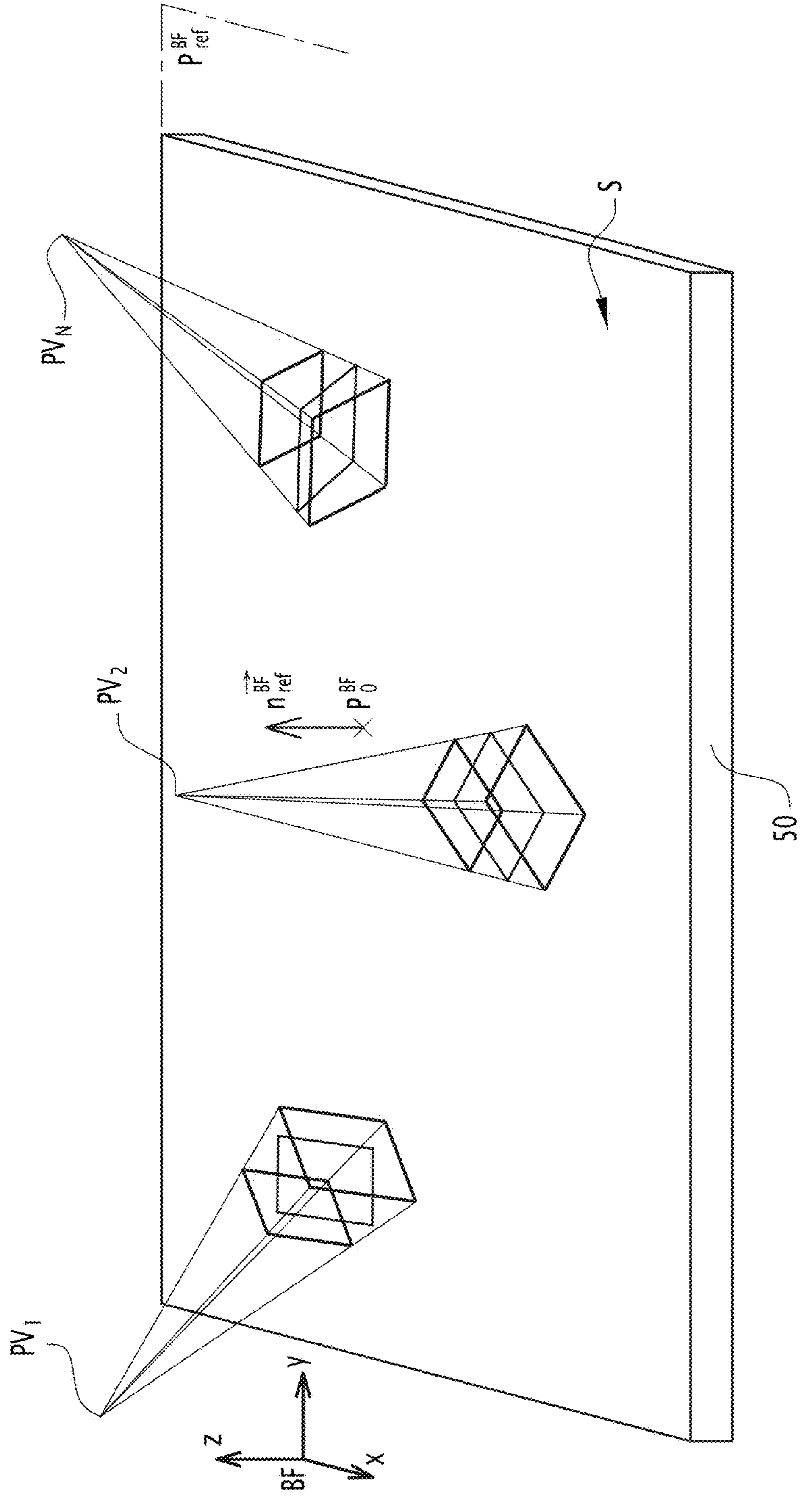
FIG. 3 is a schematic representation of a fixed plate used in the method of the invention, during one stage of this method.

From each point of view $PV_1$, $PV_2$, etc., the camera 30 is able to locate one or more clouds of points belonging to the fixed surface S, insofar as they are included in its field of view, which is represented in FIG. 3 by a four-sided polyhedron.

From the cloud or clouds of points identified by the camera 30 during this step 102, the computer 40 determines, during a step 104, an average plane, in the case where the surface S is flat as in FIG. 3, passing as best as possible through all these clouds of points. This can be determined, for example, using the least squares method. This determination makes it possible to construct a geometric reference plane $$P_{ref}^{BF},$$

representative of the fixed surface S which is itself fixed in the BF base frame. This reference plane $$P_{ref}^{BF}$$

is defined by a point of origin $$O_{ref}^{BF}$$

and a normal $$\overrightarrow{n_{ref}^{BF}}.$$

The plane $$P_{ref}^{BF}$$

is a mathematical reference surface, representative of the fixed surface S and known to the computer 40, at the end of step 104.

In the example shown, the fixed surface S is flat and the reference plane $$P_{ref}^{BF}$$

coincides with surface S.

Alternatively, the surface S can be cylindrical, pyramidal, spherical or any other shape. In this case, step 104 consists of determining an average shape associated with the cylindrical, pyramidal, spherical or any other surface S.

At the end of step 104, a mathematical reference surface, representative of the surface S, is obtained.

To implement the method of the invention, the robot 20 has the coordinates of the theoretical TCP frame of the printing head in the PG wrist frame. These coordinates of the theoretical TCP frame are taken from a CAD model of the robot 20 fitted with the printing head 10. They are used during the steps of acquiring points by printing droplets on the surface S, by bringing the printing head 10 into different positions, represented in FIG. 4 by three positions.

K is the number of print positions used for dot acquisition, where K is a natural number greater than 1. k is the sequence number of a position used to acquire points, with k being a natural number between 1 and K. Each position of the printing head 10 corresponds to a position of the wrist 21 and vice versa. In the following, therefore, a position k is referred to as the position of the printing head 10 or the position of the wrist 21 or both. In each of these positions, the printing head faces the fixed surface S of plate 50.

According to the robot 20 calibration method, the printing head is brought to a first position relative to the fixed surface S, with k equal to 1. In step 106, the robot activates certain nozzles 14 on the printing head to print an impact on the fixed surface S with each nozzle activated.

L is the number of active nozzles 14 in each position of the printing head 10, i.e. the number of drops printed on the surface S in each position.

In the version of the invention explained in detail below with reference to the figures, L is 2, which corresponds to the selection of a pair of nozzles. Advantageously, the selected nozzles are equidistant from the reference nozzle, along the x-axis of the TCP frame. In the example, these are nozzles B4 and B28 mounted on the body 12, equidistant from the reference nozzle B16.

Alternatively, another pair of nozzles 14 can be used, preferably equidistant from the reference nozzle.

During step 106, nozzle B4 prints an impact on the fixed surface S and nozzle B28 prints another impact on the fixed surface S.

In general terms, we note $$P_{k,j}^{BF}$$

a characteristic point, in the BF base frame, of the geometric centre of an impact corresponding to a droplet deposited on the surface S by the nozzle of rank j, when the wrist is in position k. We therefore respectively note $$P_{k,4}^{BF}$$

a characteristic point of the impact imparted by nozzle B4 and $$P_{k,28}^{BF}$$

a characteristic point of the impact printed by nozzle B28, when the wrist is in position k.

For each position k of the printing head 10, a vector $$V_{k}^{BF}$$

is defined which extends from the characteristic point $$P_{k,28}^{BF}$$

to the characteristic point $$P_{k,4}^{BF}.$$

We have the relation:

$$V_k^{BF} = P_{k,4}^{BF} - P_{k,28}^{BF} \quad \text{(equation 1)}$$

Each vector $$V_k^{BF}$$

can be determined by the computer 40 on the basis of the characteristic points $$P_{k,28}^{BF} \text{ and } P_{k,4}^{BF}$$

identified by the camera 30.

Alternatively, the number L is strictly greater than 2, for example equal to 5 or 7, which makes it possible to define several vectors of the type of vector $$V_k^{BF}.$$

In step 108 of the method, the coordinates of the characteristic points $$P_{1,4}^{BF} \text{ and } P_{1,28}^{BF}$$

are measured by the camera 30, which locates the impacts of the drops deposited on the surface S, then the vector $$V_1^{BF}$$

is calculated by the computer 40.

The multi-axis robot 20 then moves the printing head to at least one second position relative to the fixed surface S, different from the first position and in which the printing head 10 is also oriented towards the fixed surface. In the second position of wrist 21 and printing head 10, k is 2.

In step 110, the robot activates the same nozzles B4 and B28 of the printing head as in step 106 to print a second impact with nozzle B4 and another impact with nozzle B28 on the fixed surface S.

The other impacts printed with the nozzle B28 when the printing head 10 is in the first position, respectively in the second position, can be considered as third and fourth impacts.

In a step 112, the coordinates of the characteristic points $$P_{2,4}^{BF} \text{ and } P_{2,28}^{BF}$$

are measured by the camera 30, which detects the impacts of the drops deposited on the surface S, then the vector $$V_2^{BF}$$

is calculated by the computer 40.

If K is strictly greater than 2, steps 106 and 108 are repeated as many times as necessary using positions different from the first two positions and different from each other, for k between 3 and K.

The positions of the wrist 21, which determines the positions of the printing head 10, are chosen arbitrarily, for k between 1 and K, being different in pairs.

We respectively note $$B_{k,4}^{BF} \text{ and } B_{k,28}^{BF}$$

the positions of nozzle B4 and nozzle B28 in the BF base frame, when printing head 10 is in position k.

In the TCP frame on the printing head 10, these two positions $$B_{k,4}^{BF} \text{ and } B_{k,28}^{BF}$$

are deemed to be known, due to the definition and construction of the printing head 10.

These positions can also be expressed in the BF base frame by the following two equations:

$$B_{k,4}^{BF} = T_k^{PG\to BF} \times T^{TCP\to PG} \times B_{k,4}^{TCP} \quad \text{(equation 2)}$$

$$B_{k,28}^{BF} = T_k^{PG\to BF} \times T^{TCP\to PG} \times B_{k,28}^{TCP} \quad \text{(equation 3)}$$

where $$T_k^{PG\to BF}$$

is a matrix of the transition from the wrist PG frame to the BF base frame when the printing head 10 is in position k and $T^{TCP\to PG}$ is a passage matrix from the TCP frame to the PG wrist frame.

The first passage matrix $$T_k^{PG\to BF}$$

is an orthonormal matrix, defined for each position k, while the second passage matrix $T^{TCP\to PG}$ is independent of the position k of the printing head 10.

The second passage matrix can be expressed as $$T^{TCP\to PG} = \begin{bmatrix} \cos(X_5)\cdot\cos(X_6) & \sin(X_4)\cdot\sin(X_5)\cdot\cos(X_6) - \cos(X_4)\cdot\sin({}_6) & \cos(X_4)\cdot\sin(X_5)\cdot\cos(X_6) + \sin(X_4)\cdot\sin({}_6) & X_1 \\ \cos(X_5)\cdot\sin(X_6) & \sin(X_4)\cdot\sin(X_5)\cdot\sin(X_6) + \cos(X_4)\cdot\cos({}_6) & \cos(X_4)\cdot\sin(X_5)\cdot\sin(X_6) - \sin(X_4)\cdot\cos({}_6) & X_2 \\ -\sin(X_5) & \sin(X_4)\cdot\cos(X_5) & \cos(X_4)\cdot\cos(X_5) & X_3 \\ 0 & 0 & 0 & 1 \end{bmatrix} \quad \text{(equation 4)}$$

where the sixteen coefficients of the second passage matrix $T^{TCP\rightarrow PG}$ are expressed as a function of six parameters $X_1$ to $X_6$.

The parameters $X_1$, $X_2$ and $X_3$ correspond to a translation of the centre of the TCP frame linked to the printing head, with respect to the centre of the PG frame linked to the wrist 21, while the parameters $X_4$, $X_5$ and $X_6$ correspond to angles of rotation of the axes of these two reference frames with respect to each other. In the case of the matrix presented in equation 4, these are the angles of the Roll-Pitch-Yaw convention.

Alternatively, another representation of these angles can be used.

Knowing the second matrix $T^{TCP\rightarrow PG}$ enables the TCP frame to be positioned in the PG frame linked to the wrist, and therefore to calibrate the printing head, which forms a tool of the robot 20. The invention's method enables the parameters $X_1$ to $X_6$, and therefore this second matrix, to be determined.

We also note $$I_{k,4}^{BF} \text{ and } I_{k,28}^{BF}$$

the coordinates, in the BF base frame, of a point of intersection between the mathematical reference surface $$P_{ref}^{BF}$$

and a straight line D4 or D28 passing through nozzle B4, or nozzle B28 respectively, and parallel to the direction of ejection of coating product from the nozzle in question. More generally, $$I_{k,j}^{BF}$$

designates the coordinates, in the BF base frame, of a point of intersection between the mathematical reference surface $$P_{ref}^{BF}$$

and a straight line passing through the nozzle of rank j.

Regardless of position k, the straight line D4 or D28 passing through nozzle B4 or B28 is, by construction of the TCP frame, considered to be parallel to the z axis of this frame. Each position $$I_{k,4}^{BF} \text{ or } I_{k,28}^{BF}$$

is calculated, in a step 114, by the computer 40 as the intersection of the straight line D4 or D28, corresponding to the nozzle B4 or B28 in position k of the printing head, and the representative mathematical surface formed by the plane $$P_{ref}^{BF}.$$

In each position k, the coordinates of each intersection point $$I_{k,4}^{BF} \text{ or } I_{k,28}^{BF}$$

are expressed by the computer 40 as a function of the position $$B_{k,4}^{BF} \text{ or } B_{k,28}^{BF}$$

of the corresponding nozzle B4 or B28 and the passage matrices $$T_k^{PG\rightarrow BF}$$

and $T^{TCP\rightarrow PG}$. In particular, the coordinates of each intersection point $$I_{k,4}^{BF} \text{ and } I_{k,28}^{BF}$$

depend on the second passage matrix $T^{TCP\rightarrow PG}$, and therefore on its parameters $X_1$ to $X_6$.

In practice, the coordinates of each intersection point $$I_{1,4}^{BF} \text{ or } I_{1,28}^{BF}$$

in the first position, with k equal to 1, are expressed at a step 114 and the coordinates of each intersection point $$I_{2,4}^{BF}$$

or $$I_{2,28}^{BF}$$

in the second position, with k equal to 2, are expressed in a step 116.

The order of steps 114 and 116 is not restrictive. They can also be simultaneous.

For each position k of the printing head 10 or wrist 21, a vector $$W_k^{BF}$$

is defined which extends from the intersection point $$I_{k,28}^{BF}$$

to the intersection point $$I_{k,4}^{BF}.$$

We have the relation:

$$W_k^{BF} = I_{k,4}^{BF} - I_{k,28}^{BF} \qquad \text{(equation 5)}$$

Each vector $$W_k^{BF}$$

can be calculated by the computer 40 and also depends on the second passage matrix $T^{TCP \to PG}$ and its parameters $X_1$ to $X_6$, since this is the case for the intersection points $$I_{k,4}^{BF} \text{ and } I_{k,28}^{BF}.$$

Figure 4:
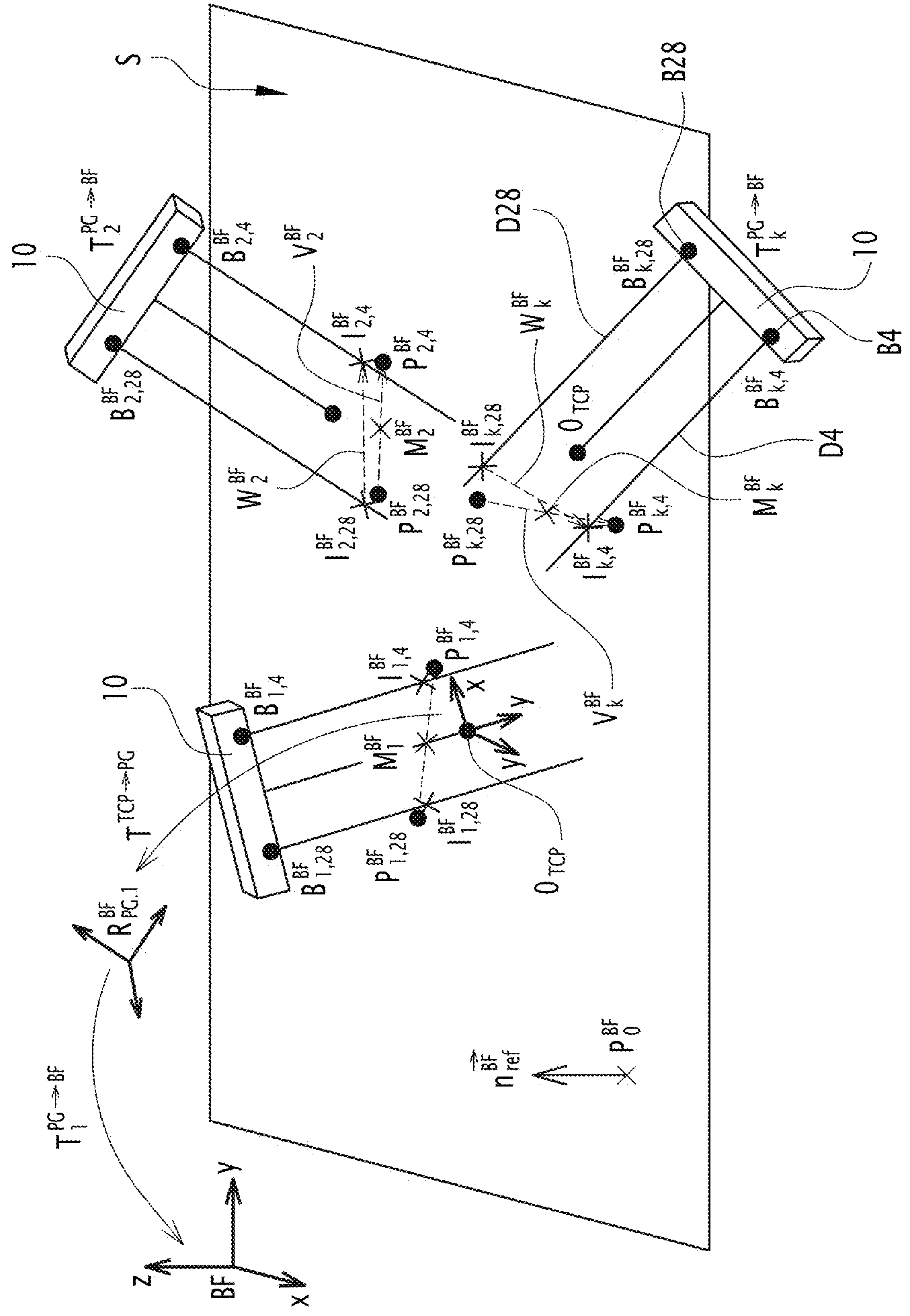
FIG. 4 is a schematic representation of the same plate in another stage of the invention.
Figure 5:
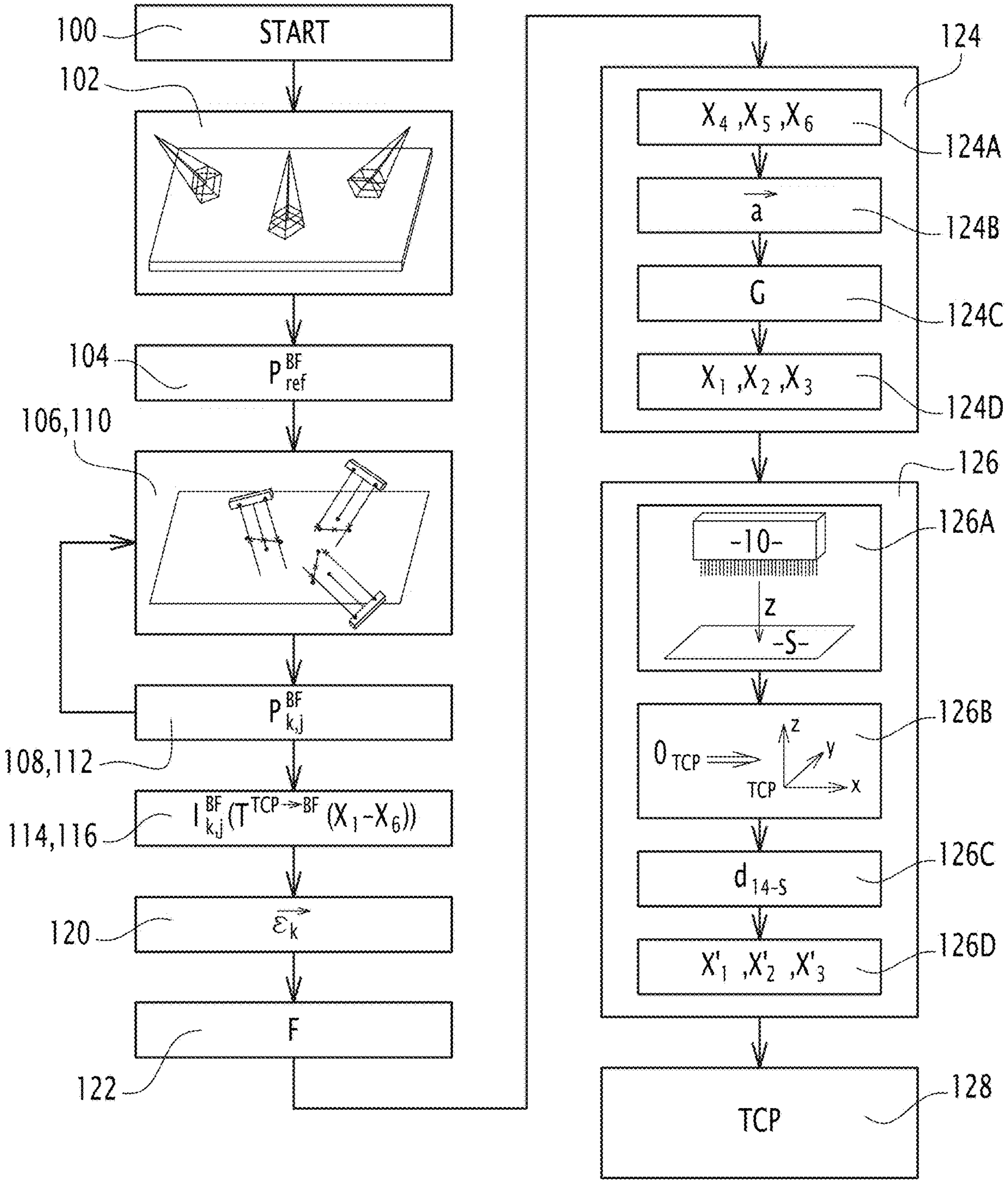
FIG. 5 is a block diagram of the method of the invention.

In theory, the $$P_{k,4}^{BF} \text{ and } I_{k,4}^{BF}$$

positions should be identical, as should the $$P_{k,28}^{BF} \text{ and } I_{k,28}^{BF}$$

positions. The vectors $$V_k^{BF} \text{ and } W_k^{BF}$$

should therefore be superimposed. However, this is not the case in practice, as shown, for example, by the vectors $$V_2^{BF} \text{ and } W_2^{BF}$$

or the vectors $$V_k^{BF}$$

and $$W_k^{BF}$$

in FIG. 4.

For each position k of the wrist 21, i.e. each position of the printing head, a first deviation $\vec{\varepsilon_k}$ is defined between the vectors $$V_k^{BF} \text{ and } W_k^{BF},$$

which the computer 40 expresses as follows, in a step 120:

$$\vec{\varepsilon_k} = W_k^{BF} - V_k^{BF} = \qquad \text{(equation 6)}$$

$$\left(I_{k,4}^{BF} - I_{k,28}^{BF}\right) - \left(P_{k,4}^{BF} - P_{k,28}^{BF}\right) = \left(T_k^{BF \to PG} \cdot I_{k,4}^{PG} - T_k^{BF \to PG} \cdot I_{k,28}^{PG}\right) - \left(T_k^{BF \to PG} \cdot P_{k,4}^{PG} - T_k^{BF \to PG} \cdot P_{k,28}^{PG}\right)$$

where $$T_k^{PG \to BF}$$

is the first passage matrix mentioned above;

$$I_{k,4}^{PG} \text{ and } I_{k,28}^{PG}$$

are the positions of the intersection points for position k, expressed in the PG frame of wrist 21 and $$P_{k,4}^{PG} \text{ and } P_{k,28}^{PG}$$

are the positions of the droplet impact centres for position k, expressed in the PG frame of wrist 21

This can be expressed as follows:

$$\vec{\varepsilon_k} = T_k^{BF \to PG} \cdot \left(\left(I_{k,4}^{PG} - I_{k,28}^{PG}\right) - \left(P_{k,4}^{PG} - P_{k,28}^{PG}\right)\right) \qquad \text{(equation 7)}$$

Since the matrix $$T_k^{BF \to PG}$$

is orthonormal, the difference between the vectors $$V_k^{BF}$$

and $$W_k^{BF}$$

can also be expressed as:

$$\vec{\varepsilon_k} = \left(I_{k,4}^{PG} - I_{k,28}^{PG}\right) - \left(P_{k,4}^{PG} - P_{k,28}^{PG}\right) \qquad \text{(equation 8)}$$

Equation 6 is the expression of the deviation $\vec{\varepsilon_k}$ in the BF base frame, while equation 8 is the expression of the same deviation in the wrist PG frame. The length of the deviation vector $\vec{\varepsilon}_k$ is the same in both cases.

Like the coordinates of the intersection points $$I^{BF}_{k,4} \text{ or } I^{BF}_{k,28},$$

the deviation $\vec{\varepsilon}_k$ depends on the second passage matrix $T^{TCP\to PG}$, and therefore on its parameters $X_1$ to $X_6$.

Each deviation $\vec{\varepsilon}_k$ can be considered as an error due to the inaccuracy of the positioning of the TCP frame in the PG frame, an error which must be minimised so that the measurement in the TCP frame of the printing head 10 is as accurate as possible in the BF base frame, by adjusting the parameters $X_1$ to $X_6$., since they are involved in defining this deviation.

In a subsequent step 122, an objective function F is constructed by the computer 40 as the sum, for all positions k, of the squares of the deviations determined in step 120, in the form:

$$F = \sum_{k=1}^{K} \|\vec{\varepsilon_k}\|^2 \qquad \text{(equation 9)}$$

In a step 124 subsequent to step 122, also implemented by the computer 40, the objective function F is minimised, making it possible to determine the values of the parameters $X_1$ to $X_6$ which reduce the overall deviation $\vec{\varepsilon}_k$ of the various positions.

Step 124 comprises a first sub-step 124A in which the objective function F is minimised by adjusting only the rotation parameters $X_4$ to $X_6$. This makes it possible to determine optimised values for these three parameters.

Minimisation of the objective function F in sub-step 124A advantageously takes place by solving a non-linear system of equations, by means of partial derivatives, from a nearby position, using the method of least squares.

Alternatively, this non-linear system of equations can be solved by the Newton method, the gradient method, the Levenberg-Marquardt method, the Newton-Raphson method, the secant method, a dichotomy method or an iterative method.

According to yet another variant, this non-linear system of equations can be solved, starting from a near position, by discretising the domain of the six parameters X1-X6 around the near position and evaluating the objective function F as a function of these parameters.

Then, in a second sub-step 124B, the computer 40 expresses another deviation $\vec{a}_k$, also known as the second deviation.

This second deviation $\vec{a}_k$ is different from the first deviation $\vec{\varepsilon}_k$ and is representative of an offset between the $O_{TCP}$ centre of the TCP frame and a mid-point $$M^{BF}_k$$

defined, in the BF base frame, between the characteristic points $$P^{BF}_{k,4} \text{ and } P^{BF}_{k,2}$$

at mid-distance from them.

In a sub-step 124B of step 124, the deviation $\vec{a}_k$ is expressed by the computer 40, for each wrist position k, as:

$$\vec{b_k} = T^{TCP\to PG} \times \begin{bmatrix} 0 \\ 0 \\ 0 \\ 1 \end{bmatrix} - \frac{1}{2} \times \left(P^{PG}_{k,4} + P^{PG}_{k,28}\right) \qquad \text{(equation 10)}$$

where $\begin{bmatrix} 0 \\ 0 \\ 0 \\ 1 \end{bmatrix}$ is the expression of the point of origin $O_{TCP}$ of the TCP frame in the PG frame.

In a subsequent sub-step 124C of step 124, an objective function G is constructed by the computer 40 as the sum, for all positions k, of the squares of the second deviations determined in sub-step 124B, in the form:

$$G = \sum_{k=1}^{K} \|\vec{b_k}\|^2 \qquad \text{(equation 11)}$$

Step 124 comprises a sub-step 124D in which the objective function G is minimised by adjusting only the translation parameters $X_1$ to $X_3$. This makes it possible to determine optimised values for these three parameters.

Advantageously, the objective function G is minimised by solving a non-linear system of equations, using a second method which may be the same as that used to minimise the objective function F or a different method. The method of least squares is particularly suitable here. The method used is preferably chosen from those listed above for minimising the objective function F.

The result of the two sub-steps 124A and 124D is that the parameters $X_1$ to $X_6$ are optimised so that the orientation of the TCP frame of reference and the position of its point of origin $O_{TCP}$ are known in the PG wrist frame of reference with good accuracy.

It is possible to be satisfied with this and proceed directly to a step 128 where the computer 40 uses the six parameters $X_1$-$X_6$ determined in step 124 to construct the second passage matrix $T^{TCP\to PG}$ and define the oriented position of the TCP frame in the PG frame.

In this case, the position of the origin $O_{TCP}$ along the z-height axis of the TCP frame is not known unequivocally.

To find out this position, the method of the invention includes an optional step 126 of correcting the position of the point of origin $O_{TCP}$ along the z-height axis of the TCP frame. This step 126 is implemented between steps 124 and 128.

During this step 126, the coordinates of the theoretical TCP frame of reference in the PG wrist frame of reference are used, which are known to the robot 20 as mentioned above.

During a sub-step 126A of step 126, the robot 20 places the printing head 10 facing the fixed surface S, arranging the x and y axes of the TCP frame, defined with the parameters $X_1$ to $X_6$ optimised in step 124, parallel to the mean plane of the fixed surface S. In other words, the nozzles 14 are oriented perpendicular to the fixed surface S. During this sub-step 126A, the robot moves the printing head towards the fixed surface until the point of origin $O_{TCP}$ of the TCP frame lies within the fixed surface S. This is considered to have been achieved when the robot 20 calculates that the point of origin $O_{TCP}$ belongs to the reference plane $$P_{ref}^{BF}.$$

In a sub-step 126B of step 126, the computer 40 projects the position of the point of origin $O_{TCP}$ of this theoretical frame onto the straight line of the heights of the TCP frame defined with the parameters $X_1$ to $X_6$ optimised in step 124.

In a sub-step of step 126C, a distance $d_{14\text{-}S}$ between one of the nozzles 14 and the fixed surface S, for example the distance between the outlet of the reference nozzle B16 and the fixed surface S, is then measured along the height axis z of the optimised TCP frame. The measuring step can be carried out automatically, using a measuring device mounted on the printing head or on the surface S, such as a laser. Alternatively, this measurement can be carried out by an operator using a measuring device independent of the robot 20, for example a ruler or a calliper.

In a sub-step 126D of step 126 following sub-step 126C, the position of the point of origin $O_{TCP}$ of the TCP frame, defined with the parameters $X_1$ to $X_6$ optimised in step 124, is corrected so that the distance $d_{14\text{-}S}$ becomes equal to a predetermined value $d_0$, for example equal to 10 mm. This amounts to placing the centre of the TCP frame, defined with the parameters $X_1$ to $X_6$ optimised in step 124, at the predetermined distance do from the fixed surface S, in this case 10 mm.

We note $d_{corr}$ the distance by which the position of the point of origin $O_{TCP}$ is corrected at sub-step 126D. We have the relation $$d_{corr} = d_{14-S} - d_0 \quad \text{(equation 12)}$$

The new parameters $X'_1$, $X'_2$ and $X'_3$ which define the position of the point of origin $O_{TCP}$ at the end of step 126 and which are calculated in sub-step 126D are defined by the following relationship:

$$\begin{bmatrix} X'_1 \\ X'_2 \\ X'_3 \\ 1 \end{bmatrix} = \begin{bmatrix} X_1 \\ X_2 \\ X_3 \\ 1 \end{bmatrix} + d_{corr} \times T^{TCP \to PG} \times \begin{bmatrix} 0 \\ 0 \\ 1 \\ 0 \end{bmatrix} \quad \text{(equation 13)}$$

Parameters $X'_1$, $X'_2$ and $X'_3$ are then used as the new optimised parameters $X_1$, $X_2$ and $X_3$.

Changing the parameters $X_1$ to $X_3$ to take on the values $X'_1$ to $X'_3$ respectively is equivalent to applying a translation along the z axis of the TCP frame, such that the measured distance $d_{14\text{-}S}$ becomes equal to the predetermined value $d_0$.

In a step 128, the six parameters $X_1$ to $X_6$ determined and optimised in step 124, some of which $X_1$ to $X_3$ may have been corrected in step 126, are used in the second pass matrix $T^{TCP \to PG}$ to define the oriented position of the TCP frame in the PG frame.

At the end of step 128, the position and orientation of the TCP frame in the PG frame are accurately and uniquely determined, and the multi-axis robot 20 is calibrated to operate the printing head in an optimised manner by moving it accurately relative to the fixed surface S.

The invention is not limited to the embodiment shown in the figures and to the variants mentioned above.

Alternatively, the first deviation between the vectors $$V_k^{BF} \text{ and } W_k^{BF}$$

can be expressed, for each position k of the wrist 21, according to one of the following approaches:

$$\vec{\varepsilon_k} = \left(P_{k,4}^{PG} - P_{k,28}^{PG}\right) \wedge \left(I_{k,4}^{PG} - I_{k,28}^{PG}\right) \quad \text{(equation 14)}$$

$$\vec{\varepsilon_k} = \frac{\left(P_{k,4}^{PG} - P_{k,28}^{PG}\right) \wedge \left(I_{k,4}^{PG} - I_{k,28}^{PG}\right)}{\left\|P_{k,4}^{PG} - P_{k,28}^{PG}\right\| \times \left\|I_{k,28}^{PG} - I_{k,28}^{PG}\right\|} \quad \text{(equation 15)}$$

$$\alpha_k = \text{Arcsin}\left(\frac{\left\|\left(P_{k,4}^{PG} - P_{k,28}^{PG}\right) \wedge \left(I_{k,4}^{PG} - I_{k,28}^{PG}\right)\right\|}{\left\|P_{k,4}^{PG} - P_{k,28}^{PG}\right\| \times \left\|I_{k,4}^{PG} - I_{k,28}^{PG}\right\|}\right) > 0 \quad \text{(equation 16)}$$

$$\alpha_k = \left(P_{k,4}^{PG} - P_{k,28}^{PG}\right) \cdot \left(I_{k,4}^{PG} - I_{k,28}^{PG}\right) \quad \text{(equation 17)}$$

$$\alpha_k = 1 - \frac{\left(P_{k,4}^{PG} - P_{k,28}^{PG}\right) \cdot \left(I_{k,4}^{PG} - I_{k,28}^{PG}\right)}{\left\|P_{k,4}^{PG} - P_{k,28}^{PG}\right\| \times \left\|I_{k,4}^{PG} - I_{k,28}^{PG}\right\|} \quad \text{(equation 18)}$$

$$\alpha_k = \text{Arccos}\left(\frac{\left|\left(P_{k,4}^{PG} - P_{k,28}^{PG}\right) \cdot \left(I_{k,4}^{PG} - I_{k,28}^{PG}\right)\right|}{\left\|P_{k,4}^{PG} - P_{k,28}^{PG}\right\| \times \left\|I_{k,4}^{PG} - I_{k,28}^{PG}\right\|}\right) \quad \text{(equation 19)}$$

In equations 14 and 15, the objective function F is the same as that defined in equation 9. In equations 16 to 19, the objective function F is expressed, for example, as:

$$F = \sum\nolimits_{k2=k1+1}^{K} \alpha_k \quad \text{(equation 20)}$$

Steps 124, 126 and 128 are then adapted.

According to another variant of the invention, the second deviation $\vec{a_k}$ is expressed in sub-step 124B as:

$$\vec{a_k} = \frac{1}{2} \times \left(I_{k,4}^{PG} + I_{k,28}^{PG}\right) - \frac{1}{2} \times \left(P_{k,4}^{PG} + P_{k,28}^{PG}\right) \quad \text{(equation 21)}$$

The rest of step 124 and steps 126 and 128 are then adapted.

According to a non-represented variant of the invention, the impacts printed during steps 106 and 110 are used to calculate a defined deviation for each position k of the wrist 21, between the coordinates of a characteristic point $$P_{k,l}^{BF}$$

and the coordinates of an intersection point $$I_{k,l}^{BF}$$

defined as above. An objective function is then defined on the basis of this deviation, for example as the sum of the squares of these deviations for all positions k, with k between 1 and K, and all nozzles l, with l between 1 and L.

This function is then minimised, for example with the method of least squares or another of the methods mentioned above, making it possible to determine the optimised values of the six parameters $X_1$ to $X_6$ of a passage matrix $T^{TCP \rightarrow PG}$ defined as above. In this case, no vector comparable to the $$V_k^{BF} \text{ and } W_k^{BF}$$

vectors mentioned above is used. In this case, the six parameters $X_1$ to $X_6$ are optimised in a common step, and not in two successive steps such as the sub-steps 124A and 124D mentioned above. A correction step, such as step 126, is advantageously implemented.

According to another variant of the invention, not shown, the mass, shape, dimensions and/or speed of the droplets are taken into account when calculating the intersection points. In other words, the straight lines D4, D28 and equivalent can be replaced by curved lines which take into account the ballistic effect of the ejection of the coating product by the nozzles 14, which results from the mass of the droplets, their shape, their dimensions and their speed. Whether it is a straight line or a curved line taking into account ballistics, a line passing through nozzles B4 and/or B28 or another nozzle is used to define each intersection point $$I_{k,j}^{BF}.$$

Alternatively, at least one of the objective functions F and G is constructed without using the square of the deviations. These functions can be equal, for example, to the sum of the absolute values of these deviations or to another value calculated from these deviations.

Steps 102 and 104 can be carried out at any time before steps 114 and 116.

The steps of the invention do not have to be repeated each time the robot 20 is put into service. Indeed, when the oriented position of the TCP frame of reference is known in the PG frame of reference, at the end of step 128, it is deemed to be invariant.

The steps in the method of the invention are preferably carried out automatically by the control unit formed by components 22 and 40. Steps 126A can also be carried out manually by an operator.

Any feature described for one embodiment or variant in the foregoing may be implemented for the other embodiments and variants described above, insofar as technically feasible.

The invention claimed is:

1. A method for calibrating a multi-axis robot associated with a base frame and equipped with a camera and a printing head comprising at least a first nozzle, the camera and the printing head being mounted on a wrist of the multi-axis robot, this method consisting of determining an oriented position of a frame associated with the printing head in a frame of reference linked to the wrist, the oriented position of the frame linked to the printing head being defined by six parameters of a transition matrix between the frame linked to the printing head and the frame linked to the wrist and this method comprising at least the following steps:

a) aiming the camera at at least one point on a surface fixed in the base frame;

b) determining, from the result of step a), a mathematical surface representative of the fixed surface;

c) bringing the printing head into a first position relative to the fixed surface, in which the printing head is oriented towards the fixed surface;

d) when the printing head is in the first position, printing at least one first impact on the fixed surface by means of the first nozzle;

e) measuring, with the camera, the coordinates, in the base frame, of a first characteristic point of the first impact;

f) bringing the printing head into at least one second position relative to the fixed surface, different from the first position and in which the printing head is oriented towards the fixed surface;

g) when the printing head is in the second position, printing at least one second impact on the fixed surface by means of the first nozzle;

h) measuring, with the camera, the coordinates, in the base frame, of a second characteristic point of the second impact;

i) expressing, in the base frame and with the transition matrix, the coordinates of a first point of intersection between the mathematical surface representative of the fixed surface and a line passing through the first nozzle in the first position;

j) expressing, in the base frame and with the transition matrix, the coordinates of a second point of intersection between the mathematical surface representative of the fixed surface and the line passing through the first nozzle in the second position;

k) expressing, for each position of the printing head and each impact printed in this position of the printing head, a deviation based on the coordinates of the characteristic point of the impact and the coordinates of the intersection point of the impact;

l) constructing an objective function whose variables are the deviations expressed in step k);

m) determining the values of the six parameters of the transition matrix which minimise the objective function constructed in step l); and n) using the six parameters determined in step m) to define the oriented position of the frame linked to the printing head in the frame linked to the wrist.

2. The method of claim 1, carried out with a printing head which comprises at least one second nozzle, wherein:

during step d), a third impact is printed on the fixed surface by means of the second nozzle;

during step e), one measures, with the camera, the coordinates, in the base frame, of a third characteristic point of the third impact;

during step g), a fourth impact is printed on the fixed surface by means of the second nozzle;

during step h), the one measures, with the camera, the coordinates, in the base frame, of a fourth characteristic point of the fourth impact;

during step i), the coordinates of a third intersection point between the mathematical surface representative of the fixed surface and a line passing through the second nozzle in the first position are expressed in the base frame and using the transition matrix; and in step j), the coordinates of a fourth intersection point between the mathematical surface representative of the fixed surface and the line passing through the second nozzle in the second position are expressed, in the base frame and using the transition matrix.

3. The method of claim 2, wherein an axis of the frame linked to the printing head is parallel to the directions of ejection of the two nozzles of the printing head and wherein the two nozzles are arranged on either side of and at equal distance from a reference nozzle of the printing head through which the axis passes.

4. The method of claim 3, wherein:

the six parameters of the transition matrix constitute three translation parameters and three rotation parameters; and wherein step m) comprises the following sub-steps:

m1) determining the three rotation parameters by minimising the objective function constructed in step l)

m2) expressing, for each printing head position and each nozzle, a further deviation based on the coordinates of the characteristic point of an impact printed in this position of the printing head and the coordinates of the intersection point of the impact, the further deviation being different from that expressed in step k);

m3) constructing another objective function, the variables of which are the deviations expressed in sub-step m2);

m4) determining the three translation parameters, by minimising the objective function constructed in step m3); and the other deviation is expressed in the following form $$\overrightarrow{a_k} = T^{TCP\rightarrow PG} \times \begin{bmatrix} 0 \\ 0 \\ 0 \\ 1 \end{bmatrix} - \frac{1}{2} \times \left(P^{BF}_{k,j} + P^{BF}_{k,j}\right)$$

or in the following form $$\overrightarrow{a_k} = \frac{1}{2} \times \left(I^{BF}_{k,j} + I^{BF}_{k,j'}\right) - \frac{1}{2} \times \left(P^{BF}_{k,j} + P^{BF}_{k,j'}\right)$$

wherein:

$\vec{a}_k$ is the other deviation expressed in sub-step m2) for position k;

$$I^{BF}_{k,j}$$

are the coordinates, in the base frame, of the point of intersection of the nozzle of rank j for position k;

$$P^{BF}_{k,j}$$

are the coordinates, in the base frame, of the characteristic point of the impact printed with the nozzle of rank j for position k;

$T^{TCP\rightarrow PG}$ is the transition matrix from the frame linked to the printing head to the frame linked to the wrist; and $$\begin{bmatrix} 0 \\ 0 \\ 0 \\ 1 \end{bmatrix}$$

is the expression of the point of origin of the printing head frame in the printing head frame.

5. The method of claim 4, wherein the objective function constructed in step m3) is the sum of the squares of the deviations expressed in sub-step m2).

6. The method of claim 1, wherein:

the six parameters of the transition matrix constitute three translation parameters and three rotation parameters; and step m) comprises the following sub-steps:

m1) determining the three rotation parameters by minimising the objective function constructed in step l);

m2) expressing, for each printing head position and each nozzle, a further deviation based on the coordinates of the characteristic point of an impact printed in this position of the printing head and the coordinates of the intersection point of the impact, the further deviation being different from that expressed in step k);

m3) constructing another objective function, the variables of which are the deviations expressed in sub-step m2); and m4) determining the three translation parameters, by minimising the objective function constructed in step m3).

7. The method of claim 6 comprising a step of correcting the point of origin of the frame linked to the printing head, implemented between steps m) and n) and comprising:

p1) placing the printing head facing the fixed surface and perpendicular to the fixed surface, in a position where the point of origin of the frame linked to the printing head is in the mathematical surface representative of the fixed surface;

p2) measuring a distance between the printing head and the fixed surface; and p3) correcting the translation parameters by applying a translation along the axis of the heights of the reference frame linked to the printing head, so that the distance measured in step p2) is equal to a predetermined distance.

8. The method of claim 6, wherein the objective function constructed in step m3) is the sum of the squares of the deviations expressed in sub-step m2).

9. The method of claim 1, wherein steps c) and d) are carried out before step e) and steps f) and g) are carried out before step h).

10. The method of claim 1, wherein the first and second positions are selected arbitrarily.

11. The method of claim 1, wherein the objective function constructed in step l) is the sum of the squares of the deviations expressed in step k).

12. The method of claim 1, wherein the determination of the values of the six parameters in step m) is carried out by:

solving a non-linear system of equations by means of partial derivatives, starting from a position near to the oriented position, according to the method of least squares, the Newton method the gradient method, the Levenberg-Marquardt method, the Newton-Raphson method, the secant method, a dichotomy method, an iterative method, or by discretising the domain of the six parameters around the near position near to the oriented position; and evaluating the objective function.

13. The method of claim 1, wherein, in step i) and/or j), the expression of the coordinates of the intersection points is obtained by expressing the intersection between the mathematical surface representative of the fixed surface and a ballistic line coming from the corresponding nozzle.

14. A multi-axis robot associated with a base frame of reference and equipped with a camera and a printing head, the printing head comprising at least a first nozzle, the camera and the printing head being mounted on a wrist of the multi-axis robot, comprising an electronic control unit configured to implement the calibration method of claim 1.

* * * * *